(12) United States Patent
Taresawa et al.

(10) Patent No.: US 11,111,877 B2
(45) Date of Patent: Sep. 7, 2021

(54) PISTON FOR INTERNAL COMBUSTION ENGINE

(71) Applicant: ART METAL MFG. CO., LTD, Ueda (JP)

(72) Inventors: Chiaki Taresawa, Ueda (JP); Nobuyuki Fujiwara, Ueda (JP); Naoki Yamakawa, Ueda (JP); Kunihiko Kobayashi, Ueda (JP)

(73) Assignee: ART METAL MFG. CO., LTD., Ueda (JP)

( * ) Notice: Subject to any disclaimer, the term of this patent is extended or adjusted under 35 U.S.C. 154(b) by 0 days.

(21) Appl. No.: 16/081,163

(22) PCT Filed: Mar. 30, 2016

(86) PCT No.: PCT/JP2016/060514
§ 371 (c)(1),
(2) Date: Aug. 30, 2018

(87) PCT Pub. No.: WO2017/168655
PCT Pub. Date: Oct. 5, 2017

(65) Prior Publication Data
US 2019/0063604 A1    Feb. 28, 2019

(51) Int. Cl.
*F02F 3/10*    (2006.01)

(52) U.S. Cl.
CPC .................................... *F02F 3/105* (2013.01)

(58) Field of Classification Search
CPC ................................ F02F 3/105; F02F 3/027
See application file for complete search history.

(56) References Cited

U.S. PATENT DOCUMENTS

| 5,195,478 A * | 3/1993 | Kawabata | F02F 3/10 123/193.4 |
| 2005/0087166 A1 | 4/2005 | Rein et al. | |

(Continued)

FOREIGN PATENT DOCUMENTS

| JP | 07-091316 A | 4/1995 |
| JP | 2001-182612 A | 7/2001 |

(Continued)

OTHER PUBLICATIONS

Corresponding International Application No. PCT/JP2016/060514, International Search Report dated May 24, 2016, 4 pages.

*Primary Examiner* — F Daniel Lopez
(74) *Attorney, Agent, or Firm* — Cooper Legal Group, LLC; Ronald M. Kachmarik

(57) ABSTRACT

A piston in which a solid lubricant resin layer made of a resin containing a solid lubricant is formed at a skirt portion. A guide groove absent area where no guide groove is formed, which is provided in a predetermined range of the solid lubricant resin layer at a center portion in a width direction. The guide grooves directing from the both ends in the width direction of the guide groove absent area to both ends in the width direction of the skirt portion. The end portions of the guide grooves extended to end edges of the solid lubricant resin layer to form open ends. The solid lubricant resin layer and the guide grooves are formed at least at a thrust side skirt portion. The guide grooves are formed in a shape inclined upward from the guide groove absent area toward the end edges of the solid lubricant resin layer.

2 Claims, 7 Drawing Sheets

(56) References Cited

U.S. PATENT DOCUMENTS

2009/0025549 A1   1/2009  Suzuki et al.
2011/0023706 A1*  2/2011  Pegg .......................... F16J 1/09
                                                                92/159

FOREIGN PATENT DOCUMENTS

| JP | 2005-320934 A | 11/2005 |
| JP | 2007-509279 A | 4/2007 |
| JP | 2009-30521 A | 2/2009 |
| JP | 2014-92124 A | 5/2014 |

* cited by examiner (A) THRUST SIDE (B) ANTI-THRUST-SIDE

Prior Art

Prior Art

Prior Art

PISTON FOR INTERNAL COMBUSTION ENGINE

TECHNICAL FIELD

The present invention relates to a piston for an internal combustion engine, and more particularly to a piston for an internal combustion engine having a skirt portion with a structure capable of reducing frictional resistance against an inner wall of a cylinder.

BACKGROUND ART

With reference to FIG. 5, a structure of a known general piston 10 for an internal combustion engine will be briefly described. In this specification, a head side (combustion chamber side) of an engine, that is, top dead center direction is referred to as "upper", and an opposite side (crankcase side), that is, the bottom dead center direction as "lower", and these "upper" and "lower" sides are not always corresponds to upper and lower sides of the engine.

As shown in FIG. 5(A), the piston 10 generally used for an internal combustion engine is provided with an upper portion called as a crown portion 11 and a skirt portion 12 provided below the crown portion 11. Upon receiving the gas pressure of the combustion gas at the top of the crown portion 11, the piston 10 is moved downward in a cylinder 50 to rotate a crankshaft (not illustrated) connected via a piston pin 13 and a connecting rod 51, and in the four-cycle engine, as the crankshaft rotates, the piston 10 is moved upward and downward in the cylinder 50 to perform the respective steps of exhaust, suction, and compression.

Since this piston 10 is formed to be slightly smaller in diameter than the inner diameter of the cylinder 50, it oscillates when moving upward and downward. However, by which the skirt portion 12 provided below the crown portion 11 is in sliding contact with the inner wall of the cylinder 50, oscillation of the piston 10 is suppressed, thus the piston 10 can be moved upward and downward smoothly in the cylinder.

Since the piston 10 is moved upward and downward in the cylinder 50 in a state where the skirt portion 12 is in sliding contact with the inner wall of the cylinder 50 as described above, the frictional resistance between the skirt portion 12 and the cylinder inner wall causes energy loss when the gas pressure generated by combustion is converted into mechanical motion.

Therefore, reducing the frictional resistance between the skirt portion 12 of the piston 10 and the inner wall of the cylinder 50 leads to an improvement in fuel consumption of the engine and an increase in output, accordingly, various proposals for reducing such frictional resistance have conventionally be proposed.

As one method for reducing such frictional resistance, the piston in which a coating layer having lubricity is formed on the surface of the skirt portion in a predetermined pattern to reduce the frictional resistance due to formation of the coating layer, and to improve lubricity by which a dent formed in a portion with no coating layer is served as an oil reservoir for keeping lubricating oil therein has been proposed (Patent Document 1).

In addition, the piston is formed in an elliptical shape with the axial direction of the piston pin as a minor diameter in consideration of thermal expansion, and in the state in which thermal expansion of the piston is insufficient such as when the engine is operated at low rotation speed or low load, shear resistance is increased due to the formation of a thick oil film at both ends in the width direction of the skirt portion, and when thermal expansion of the piston is progressed when the engine is operated at high rotational speed or high load operation, wear and seizure may occur due to that the distance between the center side of the skirt portion and the cylinder inner wall becomes narrow thus the oil film becomes thin. Therefore, in consideration of such possibility, a solid lubricant resin layer 115 is formed in a predetermined pattern on a skirt portion 112 of the piston 110, and a guide groove 120 having a groove bottom made of an oil repellent resin is formed in a portion where no solid lubricant resin layer 115 is formed to introduce the lubricating oil in the both ends in the width direction of the skirt portion 112 to the center side has also been proposed (Patent Document 2).

PRIOR ART DOCUMENTS

Patent Documents

[PATENT DOCUMENT 1] Japanese Patent Laid-Open No. 2005-320934
[PATENT DOCUMENT 2] Japanese Patent Laid-Open No. 2009-30521

DISCLOSURE OF THE INVENTION

Problem to be Solved by the Invention

Generally, there are "boundary lubrication", "mixed lubrication" and "fluid lubrication" in the lubrication state. Among these, "boundary lubrication" means the state that the oil film is thin thus the protrusions of the friction surface are contacted each other (solid contact) though some lubricating oil is existed of the friction surface, and in such lubrication state, the friction coefficient is decreased in comparison with the dry contact (contact without the lubricant), however, the friction coefficient still remains high.

In addition, "mixed lubrication" is the state that the thickness of the oil film present on the friction surface is increased as compared with the "boundary lubrication" described above, accordingly the protrusions of the friction surface are less likely to contact (solid contact) each other thus the frictional resistance is reduced, however, the contact (solid contact) between the protrusions of the friction surface locally occurs.

On the other hand, when the amount of lubricating oil on the friction surface further increases, and the friction surfaces are completely separated from each other by the oil film thereby solid contact does not occur, the state of "fluid lubrication" is generated, and in the state of "fluid lubrication", only the shear resistance of the fluid is added as frictional resistance.

When the Stribeck chart illustrating the relationship between the friction coefficient in each lubrication state and the "sliding speed*viscosity/pressure" is illustrated together with the schematic diagram of each lubrication state, such diagram is as illustrated in FIG. 6, and in the boundary lubrication and the mixed lubrication in which the solid contact occurs, the friction coefficient decreases as the oil film formed between the friction surfaces becomes thick and the portion in solid contact is reduced.

Here, as described above, the outer diameter of the piston 10 for the internal combustion engine is formed slightly smaller than the inner diameter of the cylinder 50.

As illustrated in FIG. 5(A), the piston 10 is connected to the crankshaft via the piston pin 13 and the connecting rod 51, the side under the state pressed to the inner wall of the cylinder 50 (the state where the side pressure is applied) among the side surfaces of the piston at both end sides in the orthogonal direction relative to the axis 13c of the piston pin 13 (the left and right sides in FIG. 5(A) and FIG. 5(B)) is changed depending on the inclination of the connecting rod 51.

The side to which such side pressure is applied immediately after reaching to a top dead center is called "thrust side" and the side opposite thereto is called "anti-thrust side". The piston 10 is moved in the cylinder 50 under the state where the side pressure is applied (the state where the surface pressure is increased), that is, the thrust side skirt portion 12a is pressed against the inner wall of the cylinder 50 when the piston moves downward from the top dead center toward the bottom dead center, and the anti-thrust-side skirt portion 12b is pressed against the inner wall of the cylinder 50 when the piston moves upward from the bottom dead center toward the top dead center, as a result, the frictional resistance (friction coefficient) of these portions increases (see FIG. 6).

Accordingly, if the frictional resistance of the thrust-side skirt portion 12a can be reduced when the piston 10 moves downward and if the frictional resistance of the anti-thrust-side skirt portion 12b can be reduced when the piston 10 moved upward, it is effective to reduce the frictional resistance of the entire piston 10.

Here, in the Patent Document 2, reduction of the frictional resistance of the skirt portion 112 is attempted by introducing the lubricating oil from both ends in the width direction toward the center side of the skirt portion 112 for thinning the oil films which is in the "fluid lubricating" state and formed at the both end sides in the width direction of the skirt portion 112 to reduce the shear resistance, and introducing the lubricating oil into the center side of the skirt portion 112 in the state of "boundary lubrication" or "mixed lubrication" to obtain a state of fluid lubrication, or bring the state close to the state close to the fluid lubrication to reduce the frictional resistance of the skirt portion 112.

In the configuration described in the Embodiment of the Patent Document 2, as illustrated in FIG. 7, in a predetermined range W at the center in the width direction of the skirt portion 112, a guide groove 120 inclined toward the hem side of the skirt portion (inclined downward) is formed from the both end sides in the width direction of the range W toward the center side of the skirt portion 112. By forming the guide groove 120, the lubricating oil scraped off from the inner wall of the cylinder by an oil ring (not illustrated) when the piston HO is moved downward is flown into the guide groove 120 by the own weight of the lubricating oil or the blow-down gas (blow-by gas), then introduced to the center side of the skirt portion 112 (Paragraphs [0057] and [0058] of the Patent Document 2).

However, it is considered that the effect of reducing the frictional resistance of the piston 110 according to the configuration described in the Patent Document 2 is limited.

That is, in a four-cycle engine commonly used in automobiles or the like, in each steps of suction, compression, combustion, and exhaust, the piston 110 is moved downward at the time of suction, moved upward at the time of compression, moved downward at the time of combustion, and moved upward at the time of exhaust, and such movements of the piston is repeated.

However, according to the lubrication principle described in the Patent Document 2 described above, only when the piston 110 moves downward and scrapes off the lubricating oil from the wall surface of the cylinder, especially when the piston moves downward in the combustion step where the blow-down gas is generated, the lubricating oil can be introduced to the center side of the skirt portion 112. Even when the piston 110 is moved upward during the compression step or the exhaust step or in the suction step where no blow-down gas is generated even when the piston 110 is moved downward, the improvement in lubrication cannot be expected.

Moreover, when the piston is moved downward in the combustion step, the thrust side skirt portion is firmly pressed against the inner wall of the cylinder 50 by the combustion pressure in the combustion chamber, and the surface pressure with the inner wall of the cylinder 50 is increased, accordingly, the lubricating oil in the portion is pushed out toward both ends in the width direction of the skirt portion 12a as indicated by arrows in the enlarged view of FIG. 5 (B).

In addition, as described in the Embodiment in of the Patent Document 2, when the guide groove 120 having a pattern inclined downward from the both ends in the width direction to the center side of the skirt portion 1 is formed, it is considered that the lubricating oil in the guide groove 120 flows from the center side toward both end sides in the width direction of the skirt portion 112 when the piston 110 moves downward thereby discharge the lubricating oil at the center side of the skirt portion 112.

Therefore, even if the guide groove 120 having the structure described in the Patent Document 2 is provided for the thrust-side skirt portion 12a, it is difficult to introduce the lubricating oil between the center in the width direction of the thrust-side skirt portion 12a and the inner wall of the cylinder against the flow of the lubricating oil described above when the piston 110 moved downward in the combustion step. In the configuration described in the Patent Document 2, even if the frictional resistance of the anti-thrust side skirt portion 112b can be reduced when the piston 110 is moved downward, it is considered that the effect of reducing the frictional resistance of the thrust side skirt portion 12a where the decrease of the frictional resistance is more required than the anti-thrust side is low.

In consideration of the above aspects, the inventors of the present invention have studied a configuration capable of reducing the frictional resistance of the skirt portion at the side which is in sliding contact with the inner wall of the cylinder by the side pressure. Through much trial and error, they repeated the sliding experiments in which the patterns of the guide grooves are changed. As a result, they developed a guide groove pattern effective for reducing the frictional resistance.

The present invention was obtained as a result of the above experiments by the inventors of the present invention and directed to provide the piston for the internal combustion engine which can drastically reduce the frictional resistance when the piston is pressed against a skirt portion, especially against a cylinder inner wall of the piston, accordingly enabling to reduce the fuel consumption of the engine and increase the output only by replacing the piston, without changing the other structures of the engine.

Means for Solving the Problems

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above object, a piston 10 for an internal combustion engine of the present invention in which a solid lubricant resin layer 15 (gray portion in FIGS. 1 to 3) made of a resin containing a solid lubricant such as molybdenum disulfide is formed at a skirt portion 12 of the piston 10 in a predetermined pattern, thereby guide grooves 20 for guiding lubricating oil are formed at a portion where no solid lubricant resin layer 15 is formed, comprises:

a guide groove absent area 15a where no guide groove 20 is formed, which is provided in a predetermined range of the solid lubricant resin layer 15 at a center portion in a width direction of the skirt portion 12, and the guide grooves 20 directing from the both ends in the width direction of the guide groove absent area 15a to both ends in the width direction of the skirt portion 12 are provided;

the end portions of the guide grooves 20 are extended to end edges of the solid lubricant resin layer 15 to form open ends 20e of the guide grooves 20; and the solid lubricant resin layer 15 and the guide grooves 20 are formed at least at a thrust side skirt portion 12a, and the guide grooves 20 are formed in a shape inclined upward from the guide groove absent area 15a toward the end edges of the solid lubricant resin layer 15 (Refer to FIG. 1(A), FIG. 2(A) and FIG. 3 (A)).

The solid lubricant resin layer 15 and the guide grooves 20 are further formed in an anti-thrust side skirt portion 12b, and guide grooves 20 formed in the anti-thrust side skirt portion 12b are formed in a shape which is inclined downward from the guide groove absent area 15a toward edge ends of the solid lubricant resin layer 15 (See FIG. 1(B), FIG. 2 (B), and FIG. 3 (B)).

Further, a portion where no solid lubricant resin layer 15 is formed is provided in a predetermined width at the both ends in the width direction of the skirt portion 12 (12a, 12b) to form introduction portions 21 for introducing the lubricating oil and the introduction grooves 21 may be communicated with the open ends 20e of the guide grooves 20.

In this case, a reference line Lb orthogonal to an axis 13c of a piston pin and extending in a diametrical direction of the piston 10 is assumed, and the reference line Lb is set to 0°, an intersection X of the axis of the piston pin and the reference line Lb is set as a center, and the guide groove absent area is formed in a range within ±5° to ±45°, preferably ±10° to ±40° with respect to the reference line Lb.

According to the piston 10 for an internal combustion engine of the present invention, by employing the configuration of the present invention described above, the frictional resistance of the piston 10 can be drastically reduced with a comparatively simple configuration such that the solid lubricant resin layer 15 is formed in a predetermined pattern, and the guide grooves 20 formed in a desired pattern are provided in the portion where no solid lubricant resin layer 15 is formed. As a result, improvement of the fuel economy and the output of the engine can be achieved only by replacing the piston 10 without changing the other structures of the engine.

BRIEF DESCRIPTION OF DRAWINGS

FIG. 5(A) is a front view, and FIG. 5(B) is a plan view.

DETAILED DESCRIPTION OF THE PREFERRED EMBODIMENTS

Figure 1:
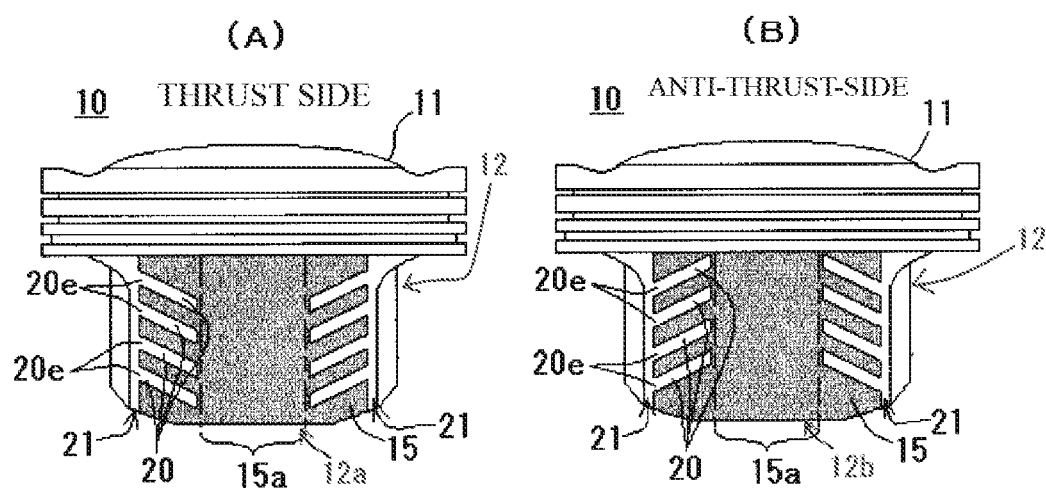
FIG. 1(A) is a side view of a thrust side and FIG. 1(B) is a side view of an anti-thrust side of the piston for an internal combustion engine according to the present invention.

Next, an embodiment according to the present invention will be described with reference to the accompanying drawings. The members and portions which are the same as the above mentioned conventional arts are denoted with the same names and reference numerals.

Object to be Treated (Piston for Internal Combustion Engine)

The piston 10 for an internal combustion engine which is an object to be treated in the present invention is not particularly limited as long as it is the piston for internal combustion engines. The present invention is applicable to any piston for a gasoline engine or a diesel engine.

An aluminum-silicon based alloy or the like is generally used as the material of the piston for the internal combustion engine. However, the material of the piston for an internal combustion engine to which the present invention is applied is not particularly limited. Thus the present invention is applicable to the piston made of various materials known as the material of the piston for the internal combustion engine.

Solid Lubricant Resin

The solid lubricant resin layer 15 is formed in a predetermined pattern on the skirt portion 12 of the piston 10 for the internal combustion engine described above, and the guide groove 20 for guiding lubricating oil is formed at a portion where no solid lubricant resin layer 15 is formed.

The solid lubricant resin layer 15 and the guide groove 20 are formed at least on the thrust side skirt portion 12a among the skirt portion 12 (12a, 12b) of the piston 10, preferably the solid lubricant resin layer 15 and the guide groove 20 are formed not only on the thrust side skirt portion 12a but also on the anti-thrust side skirt portion 12b.

This solid lubricant resin is prepared by dispersing one or more types of solid lubricant(s) such as molybdenum disulfide, graphite, fluororesin (tetrafluoroethylene (PTFE) etc.), tungsten disulfide, metal oxide and the like, in a binder made of one or more types of resin(s) such as epoxy resin, phenolic resin, polyamide resin, polyamide-imide resin, or the like. Such solid lubricant resin is applied to the skirt portion 12 of the piston 10 by a known method in a predetermined pattern, then the solid lubricant resin is dried and cured to form the solid lubricant resin layer 15.

The constitution of the solid lubricant resin used in the present invention is not particularly limited and various solid lubricant commercially available may be used as long as it has heat resistance which is sufficient to be used for a piston of an internal combustion engine. As an example, a solid lubricant resin used in the embodiment of the present invention is the solid lubricant resin containing 50% to 70% by mass of molybdenum disulfide in which molybdenum disulfide having an average particle size of 0.1 μm to 10.0 μm is dispersed as a solid lubricant in a binder of a polyamide-imide resin.

The solid lubricant resin layer 15 is formed by coating the solid lubricant resin described above to the surface of the skirt portion 12 of the piston 10 to which necessary pretreatment such as degreasing, chemical conversion treatment, sandblasting, drying is applied. The coating the solid lubricant resin to form the solid lubricant resin layer 15 is performed so that the guide groove 20 described later is formed in a predetermined pattern by using various conventional coating technique such as immersion or spraying or the like, then fixing the coated solid lubricant resin by baking dry or the like.

The film thickness of the solid lubricant resin layer 15 to be formed can be appropriately adjusted according to various conditions, however the film thickness is about 3 μm to 25 μm as an example.

Guide Groove

As already mentioned, in order to reduce the frictional resistance of the piston, it is effective to reduce the frictional resistance of the skirt portion on the side pressed against the inner wall of the cylinder. As one example, since the thrust side skirt portion 12a is in sliding contact with the cylinder inner wall while being pressed against the cylinder inner wall when the piston is moved downward in the combustion step, it is effective to reduce the frictional resistance of the thrust side skirt portion 12a.

Such reduction in the frictional resistance is achieved by thickening the oil film formed between the center portion in the width direction of the thrust side skirt portion 12a and the cylinder inner wall to obtain a state of fluid lubrication, or a state close to the fluid lubrication.

On the other hand, when the piston is being moved downward in the combustion step, the thrust side skirt portion 12a is pressed against the inner wall of the cylinder with a large force by the combustion pressure in the combustion chamber thus the surface pressure is increased, therefore, it is difficult to introduce the lubricating oil between the thrust side skirt portion 12a and the cylinder inner wall when the piston 10 is being moved downward, as described above.

Therefore, the inventors of the present invention considered that the frictional resistance can be reduced by introducing lubricating oil between the center portion of the thrust side skirt portion 12a and the cylinder inner wall in the compression step, i.e. the step before entering the combustion step, to create a state in which the lubricating oil is abundantly present, thereby starting the downward movement of the piston 10 in such state.

Moreover, when the piston is moved upward in the compression step, the anti-thrust side skirt portion 12b is pressed against the cylinder inner wall, and the lubricating oil can be introduced between the center portion of the thrust side skirt portion 12a and the cylinder inner wall relatively easily, therefore, it is considered that a relatively thick oil film can be formed in this portion.

Under the above assumption, in the piston 10 of the present invention, the guide groove absent area 15a with no guide groove 20 is formed in the center portion in the width direction of the thrust side skirt portion 12a, that is, in the solid lubricant resin layer 15 which is in sliding contact with the cylinder inner wall.

Figure 8:
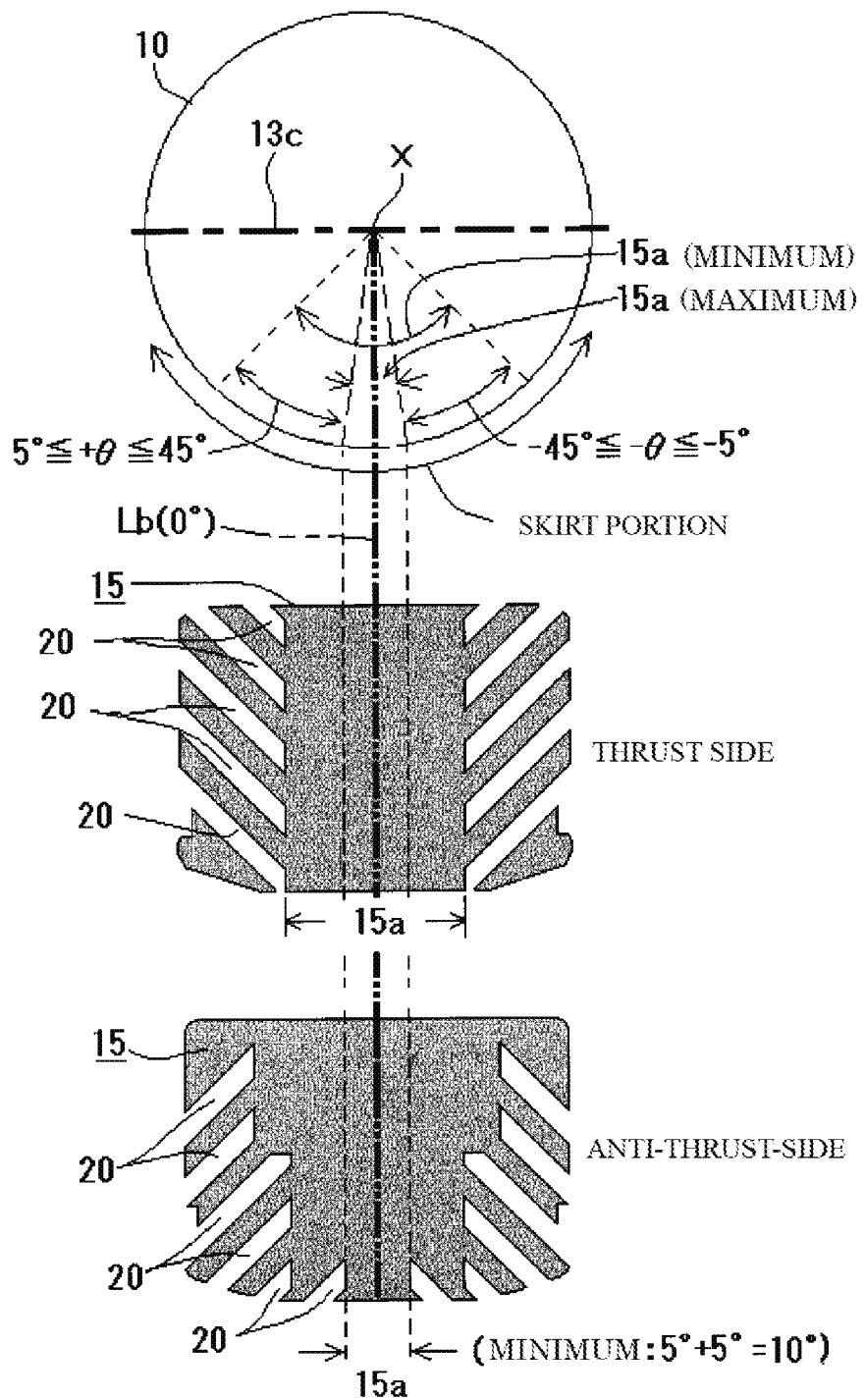
FIG. 8 is an explanation drawing of a forming range of the guide groove absent area.

FIG. 8 is an explanation drawing of the forming range of the guide groove absent area 15a together with one example of formation pattern of the guide groove 20 according to the present invention.

As shown in FIG. 8, a reference line Lb orthogonal to the axis 13c of the piston pin and extending in the diametrical direction of the piston 10 in a plan view of the piston 10 is assumed, the reference line Lb is set to 0°, the intersection X of the axis 13c of the piston pin and the reference line Lb is set as the center, then, this guide groove absent area 15a is formed into a flat surface at the +θ side and the −θ side of the reference line Lb respectively in a range within 5° to 45° (10 to 90 in total), preferably in the range of 10° to 40° (20° to 80° in total), and in the present embodiment, 20° (40° in total). Then a guide grooves 20 inclined upward from both ends in the width direction of the guide groove absent area 15a toward both ends in the width direction of the thrust side skirt portion 12a are formed, and the guide groove 20 are extended to a peripheral edge of the solid lubricant resin layer 15 to form ends of the guide grooves 20 as open ends 20e.

In this way, the guide groove 20 inclined upward is formed from the both ends in the width direction of the guide groove absent area 15a toward the both ends in the width direction of the thrust side skirt portion 12a, and the end of the guide groove 20 is formed as an open end 20e, thereby, when the piston 10 is moved upward in the compression step, the lubricating oil existed on the both end sides in the width direction of the thrust side skirt portion 12a flows into the guide groove 20 via the open end 20e then moved in the guide groove 20 toward the side of the guide groove absent area 15a, then introduced between the guide groove absent area 15a and the cylinder inner wall to increase a thickness of the oil film at this portion, accordingly, the downward movement of the piston in the combustion step subsequent to this compression step can be started in a state in which the lubricating oil is abundantly existed between the guide groove absent area 15a and the cylinder inner wall.

In addition, by forming the guide groove absent area 15a in which the guide groove 20 is not formed at the center portion in the width direction of the thrust side skirt portion 12a to form the portion in sliding contact with the cylinder inner wall as a flat surface, in the guide groove absent area 15a, there is no guide groove 20 that can release the lubricating oil, and by introducing the lubricating oil simultaneously from the both sides in the width direction of the thrust side skirt portion 12a, the lubricating oil introduced into this region is difficult to escape, and, no dents such as grooves are present, accordingly, lubricating oil that does not contribute to the increase of the oil film by being accumulated in the dents does not generate, thereby, the introduced lubricating oil is used for increasing an interval between the guide groove absent area 15a and the cylinder inner wall, thus it is considered that the thickness of the oil film can be simply increased.

On the other hand, on the contrary to the thrust-side skirt portion 12a, the anti-thrust-side skirt portion 12b is pressed against the cylinder inner wall when the piston 10 is moved upward in the compression step or the exhaust step. Therefore, if the upward movement of the piston 10 can be started in a state where the lubricating oil is abundantly existed by introducing the lubricating oil between the guide groove absent area 15a of the anti-thrust side skirt portion and the cylinder inner wall surface when the piston is moved downward in the combustion step or the suction step, the frictional resistance at the time of the upward movement of the piston 10 can also be drastically reduced.

Therefore, in the anti-thrust side skirt portion 12b, the guide grooves 20 inclined downward from the both ends in the width direction of the guide groove absent area 15a toward both ends in the width direction of the anti-thrust side skirt portion 12b are formed, and the end portions of the guide grooves 20 are extended to the peripheral edge of the solid lubricant resin layer 15 so as to form open ends 20e.

With the above configuration, when the piston 10 moved downward, the lubricating oil is flown into the guide grooves 20 (see FIG. 1(B)) provided in the anti-thrust side skirt portion 12b via the open ends 20e, then the flown lubricating oil is further flown into the guide groove absent area 15a to increase the thickness of the oil film between the guide groove absent area 15a and the cylinder inner wall, whereby, the upward movement of the piston in the exhaust step or the compression step subsequent to the combustion step or the suction step can be started in a state where the lubricating oil is abundantly existed.

As described above, in the piston 10 of the present invention, the guide grooves 20 formed in the thrust-side skirt portion 12a and the guide grooves 20 formed in the anti-thrust-side skirt portion 12b are formed in the direction in which the inclination direction is vertically (i.e., in the upper and lower direction) reversed, not only the frictional resistance caused when the piston 10 is moved downward but also the frictional resistance caused when the piston 10 is moved upward can be reduced.

In each of the thrust-side skirt portion 12a and the anti-thrust-side skirt portion 12b, in order to facilitate the introduction of the lubricating oil into the open ends 20e of the guide grooves 20, in the piston 10 of the present invention, the guide groove absent area 15a is provided with a predetermined width at both ends in the width direction of each of the skirt portion 12 (12a, 12b) so to form introduction portions 21 which are provided for introducing for the lubricating oil, and communicates with the open ends 20e of the guide grooves 20.

With such a configuration, not only the lubricating oil existing in the vicinity of the open ends 20e of the guide grooves 20 but also the lubricating oil existing around the introducing portions 21 communicating with the open ends 20e is easily introduced into the guide grooves 20, thereby the lubricating oil can be introduced more smoothly into the guide grooves 20.

In the examples illustrated in FIGS. 1(A) and 1(B), four pairs of the guide grooves 20 are respectively provided so that the guide grooves 20 which are formed at the left side of the drawings and the guide grooves 20 which are formed at the right side of the drawings become paired with respect to the center in the width direction of the skirt portion 12. (12a, 12b). However, the number of the guide grooves 20 to be formed may be more or less than the number of the guide grooves 20 in the example illustrated in FIGS. 1(A) and 1(B).

Furthermore, in the examples illustrated in FIGS. 1(A) and 1(B), the guide grooves 20 forming each pair are arranged at the same height so as to be bilaterally symmetrical with respect to the center of the skirt portion 12 (12a, 12b). However, the guide grooves 20 may be paired with the guide grooves 20 arranged at different heights on the left and right sides.

Further, in the embodiment illustrated in FIG. 1, the above-mentioned guide groove absent area 15a is provided as a belt-shaped portion having a constant width in the height direction, however the shape of the guide groove absent area 15a is not limited to the shape illustrated in FIG. 1 and any shape can be employed as long as the above-mentioned guide groove absent area 15a is provided at least at the portion which is contacted with the cylinder inner wall. As one example, as illustrated in FIGS. 3(A) and 3(B), the guide groove absent areas 15a may be formed so as to have different widths between each of an upper side and an lower side, for example, between the upper side and the lower side in view of the axis of the piston pin 13.

Figure 2:
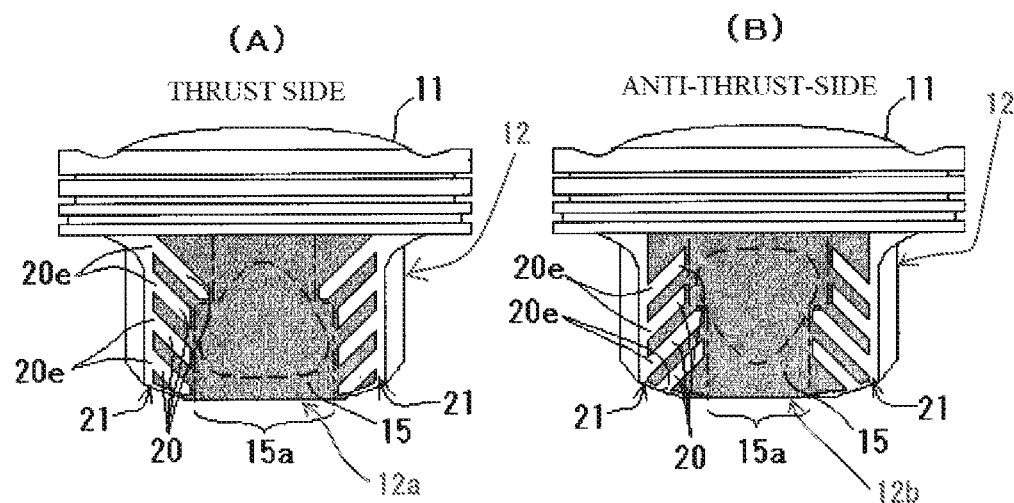
FIG. 2(A) is a side view of a thrust side and FIG. 2(B) is a side view of an anti-thrust side of the piston for an internal combustion engine according to a modified example of the present invention.

In this case, because of oscillation of the piston 10, in the thrust side skirt portion 12a, the range of sliding contact with the cylinder inner wall tends to be that the sliding contact width at the lower side of the skirt portion 12a becomes wide as indicated by the broken line in FIG. 2(A), and in the anti-thrust side skirt portion 12b, the range of sliding contact with the cylinder inner wall tends to be that the sliding contact width at the upper side of the skirt portion 12b becomes wide as indicated by the broken line in FIG. 2(B). Therefore, the guide groove absent area 15a may be formed with a pattern vertically reversed at the thrust side and the anti-thrust side. Furthermore, either one of the thrust side skirt portion 12a or the anti-thrust side skirt portion 12b, the guide groove absent area 15a having a constant width as described above with reference to FIG. 1(A) may be provided and, on the other side, the guide groove absent area 15a having different width between the upper side and the lower side as illustrated in FIG. 2 may be formed.

Therefore, in the configuration in which the formation width of the guide groove absent area 15a is changed between the upper side and the lower side thereof as described above, the guide groove 20 to be formed has different lengths between the upper side and the lower side of the skirt portion.

EMBODIMENT

Next, a motoring friction test results carried out using the piston 10 of the present invention in which the guide grooves 20 were formed in the above-described pattern in the skirt portion 12 (12 a, 12b) are shown below.

Motoring Friction Test (1) Purpose of the Test

The test is directed to confirm the frictional resistance of the piston having the guide grooves formed with the pattern according to the present invention is reduced.

(2) Test Method

In the motor friction measurement, an engine (an in-line four-cylinder, 2.5 liter, gasoline engine) for an automobile is used for the test; the output torque of the external motor when the engines are respectively operated by the external motors for the above engine equipped with a piston having the guide grooves formed in the skirt part according to the present invention with the patter of the present invention (Embodiment), and the above engine equipped with a piston in which only the solid lubricant resin layer is formed without the guide groove in the skirt portion (comparative example); then the measured difference in torque is evaluated as the difference in frictional resistance.

(3) Embodiment and Comparative Example (3-1) Embodiment

Figure 3:
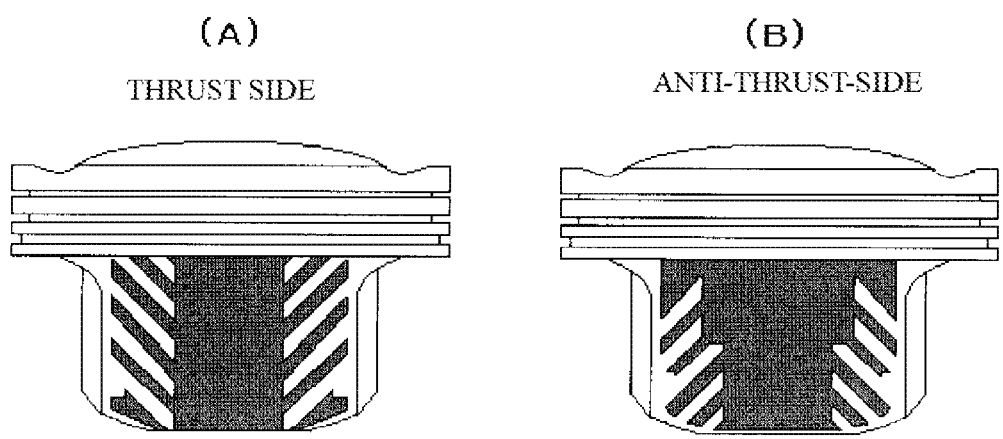
FIG. 3(A) is a side view of a thrust side and FIG. 3(B) is a side view of an anti-thrust side of the piston according to the present invention which is used for the motoring friction test.

In FIG. 3, the formation pattern of the guide groove of the piston according to the present invention (Embodiment)

used for the motoring friction measurement is illustrated. In FIG. 3, the gray portion is the portion where the solid lubricant resin layer is formed, and the white portion is the formation portion of the groove (the guide groove 20, the introduction portions 21).

FIG. 3(A) illustrates the pattern of the guide groove formed in the thrust side skirt portion. FIG. 3(B) illustrates the pattern of the guide groove formed in the anti-thrust side skirt portion.

(3-2) Comparative Example

The comparative example is the piston in which no guide groove is provided at the thrust side skirt portion and the anti-thrust side skirt portions, and a solid lubricant resin layer is formed on the entire surface of the skirt portion.

(4) Test Results

Figure 4:
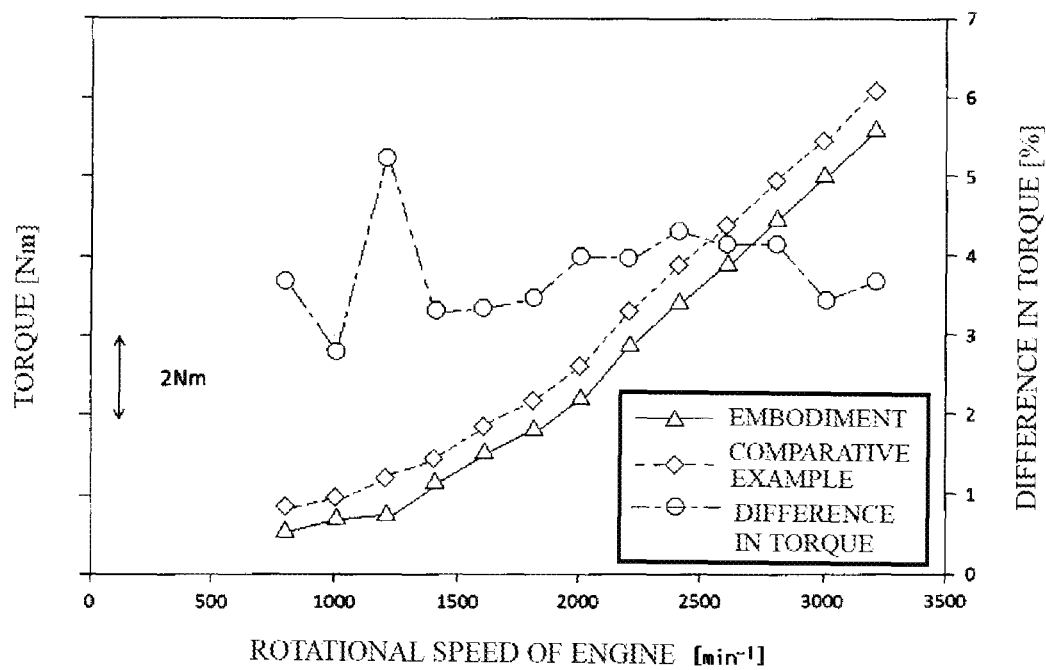
FIG. 4 is a graph illustrating the result of the motoring friction test.
Figure 5:
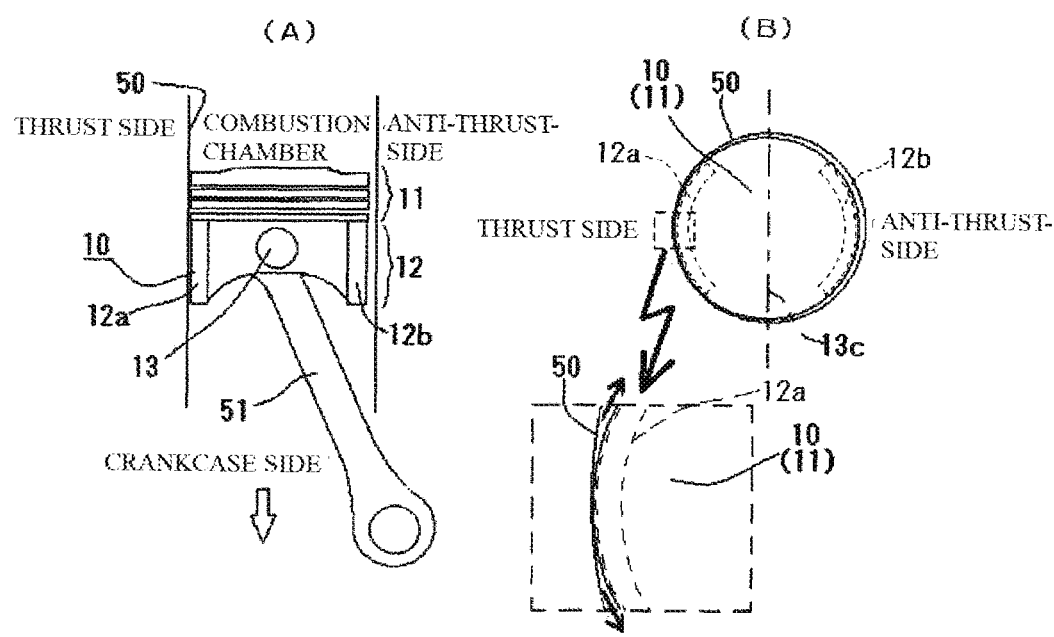
FIGS. 5(A) and 5(B) are schematic explanation drawings of the conventional piston.
Figure 6:
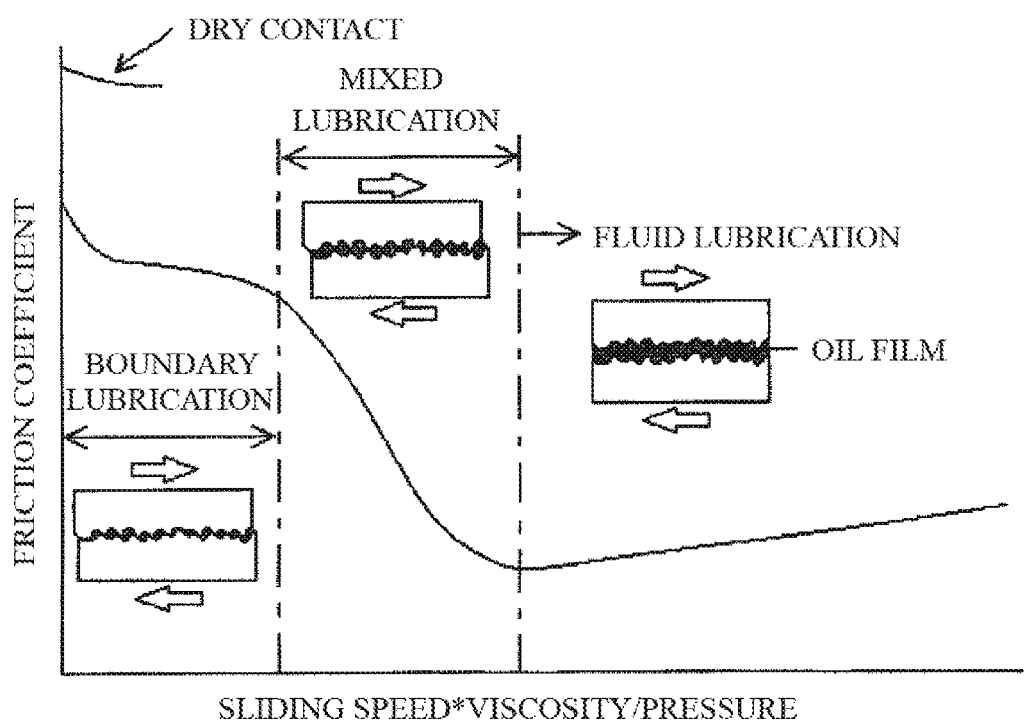
FIG. 6 is an explanation drawing explaining the state of lubrication (Stribeck chart).
Figure 7:
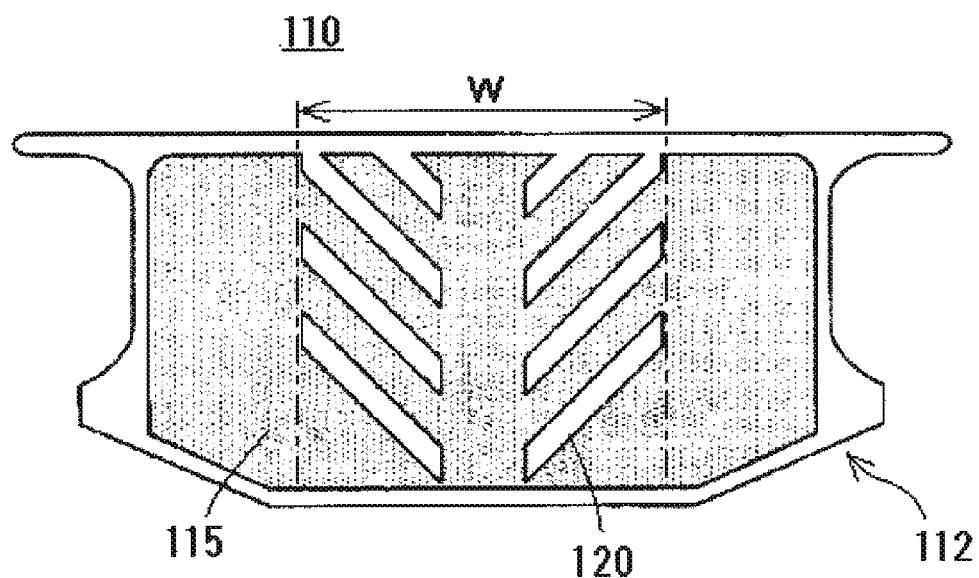
FIG. 7 is an explanation drawing of the conventional piston (corresponding to FIG. 6 of the Patent Document 2).

FIG. 4 shows the results of the motoring friction test conducted using pistons of the embodiment and comparative example described above.

According to the graph of FIG. 4, in the entire range of the measured rotational speed, when the piston of the embodiment of the present invention was mounted, the piston could be moved with a low torque, thus the frictional resistance of the piston was decreased as compared with the comparative example. This difference in torque exceeded by about 4% on average and exceeded by 5% at the maximum.

Considering that the frictional resistance of the piston system occupies most of the frictional resistance of the piston ring, the reduction of the frictional resistance of the above-mentioned numerical values as a whole for the piston by the structure change of the skirt portion which was confirmed in the test is the good result. Therefore, it was confirmed by the test that the effect of reducing the frictional resistance of the skirt portion by the formation of the guide groove with the pattern of the present invention was extremely prominent.

DESCRIPTION OF REFERENCE NUMERALS

10 Piston
11 Crown portion
12 Skirt portion
12a Thrust side skirt portion
12b Anti-thrust side skirt portion
13 Piston pin
13c Axis (of the piston pin)
15 Solid lubricant resin layer
15a Guide groove absent area
20 Guide groove
20e Open end
21 Introduction groove
50 Cylinder
51 Connecting rod
110 Piston
112 Skirt portion
115 Solid lubricant resin layer
120 Guide groove

The invention claimed is:

1. A piston for an internal combustion engine having a crown portion and a skirt portion projecting downward from the crown portion, the skirt portion having a thrust-side skirt portion and an anti-thrust-side skirt portion with the thrust-side skirt portion being located along a first direction away from a piston pin and the anti-thrust-side skirt portion being located along a second direction, opposite to the first direction, from the piston pin, a solid lubricant resin layer made of a resin containing a solid lubricant is located on each of the thrust-side skirt portion and the anti-thrust-side skirt portion in a predetermined pattern, guide grooves for guiding lubricating oil are formed at a portion of each of the thrust-side skirt portion and the anti-thrust-side skirt portion where no solid lubricant resin layer is formed, comprising:
   a center portion in a width direction of each of the thrust-side skirt portion and the anti-thrust-side skirt portion is formed with the solid lubricant resin layer having no guide groove,
   each guide groove is formed from an end in the width direction of the center portion toward an end in the width direction of the thrust-side-skirt portion or the anti-thrust-side skirt portion,
   each guide groove has an open end, nearest the end in the width direction of the thrust-side skirt-portion or the anti-thrust-side skirt portion; and
   all the guide grooves of the thrust-side skirt portion having a shape inclined upward from the center portion toward the end in the width direction of the thrust-side skirt-portion, and being provided so as to move the lubricating oil existing in the vicinity of the end in the width direction of the thrust-side skirt-portion into the center portion when the piston moves upward,
   all the guide grooves of the anti-thrust-side skirt portion having a shape inclined downward from the center portion toward the end in the width direction of the anti-thrust-side skirt-portion, and being provided so as to move the lubricating oil existing in the vicinity of the end in the width direction of the anti-thrust side skirt-portion into the center portion when the piston moves downward, and
   the center portion is formed in a range within ±10° to ±40° with respect to a reference line set as 0° around intersection of the axis of the piston pin and the reference line is set as a center, the reference line being a line orthogonal to an axis of the piston pin and extending in a diametrical direction of the piston.

2. The piston for an internal combustion engine according to claim 1, wherein introduction portions are formed at the respective ends in the width direction of the thrust-side skirt portion or the anti-thrust side skirt portion, which has no solid lubricant resin layer, for introducing the lubricating oil and the introduction portions communicate with the open ends of the guide grooves.

* * * * *